United States Patent [19]

Browne

[11] 3,804,988

[45] Apr. 16, 1974

[54] CARRIER SYSTEM FOR EFFICIENT CONNECTION OF TELEPHONE SUBSCRIBERS TO CENTRAL OFFICE

[75] Inventor: Sidney Browne, Falls Church, Va.

[73] Assignee: Carrier Telephone Corporation of America, Inc., Falls Church, Va.

[22] Filed: July 14, 1972

[21] Appl. No.: 271,737

[52] U.S. Cl. .......................... 179/15 FS, 179/2.5 R

[51] Int. Cl. .......................................... H04j 1/06

[58] Field of Search ......... 179/15 FD, 15 FS, 2.5 R, 179/15 BP, 15 R, ; 325/184; 331/19, 37, 38

[56] References Cited

UNITED STATES PATENTS

| | | | |
|---|---|---|---|
| 3,588,361 | 6/1971 | Hurault | 179/2.5 R |
| 3,548,106 | 12/1970 | Watson | 179/2.5 R |
| 3,475,561 | 10/1969 | Krasin | 179/2.5 R |
| 2,721,897 | 10/1955 | Schneckloth | 179/2.5 R |

*Primary Examiner*—Kathleen H. Claffy
*Assistant Examiner*—David L. Stewart
*Attorney, Agent, or Firm*—Rose & Edell

[57] ABSTRACT

Multiple adjacent frequency channels employ single sideband AM transmission to afford optimized shared utilization of a common telephone transmission line while adhering to a station carrier frequency standard in which the carriers transmitted from subscribers to the central office reside in a different frequency band than carriers transmitted from the central office to subscribers. In one embodiment, requiring only a single oscillator per channel, each sideband is transmitted with its carrier; further, each subscriber carrier is an integral sub-multiple of the central office carrier for that channel and is obtained by frequency division of the central office carrier. In a second embodiment a common IF oscillator at the central office is used for modulation and detection, permitting identical IF filters to be employed in each channel. In a third embodiment the concepts of the first two embodiments are combined to require only a single oscillator per channel and to permit utilization of standard filters in each channel.

19 Claims, 5 Drawing Figures

PATENTED APR 16 1974

3,804,988

SHEET 1 OF 3

CARRIER SYSTEM FOR EFFICIENT CONNECTION OF TELEPHONE SUBSCRIBERS TO CENTRAL OFFICE

BACKGROUND OF THE INVENTION

The present invention relates to telephone station carrier equipment and, more particularly, to an improved frequency multiplexed telephone system which affords optimum utilization of the allotted frequency band at relatively low cost.

A major problem in the area of multi-channel frequency multiplexing on a common telephone line has been cross talk between channels. In order to minimize cross talk in such systems, the Rural Electrification Administration (REA) has promulgated a frequency standard (see FIG. 1) for station carrier equipment. As illustrated, the band of subscriber carrier frequencies extends from 8 to 56 KHz and is subdivided into 12 4KHz bands. Likewise, the band of central station carrier frequencies extends from 64 to 136 KHz and is subdivided into 18 4 KHz bands. Since all carrier frequencies on a shared line must be different, the maximum number of channels which can share a common transmission is 12, the maximum number of subscriber carriers.

One of the foremost considerations in the design of station carrier equipment is cost. In multi-channel frequency multiplex equipment, the major cost items are the oscillators which must have highly stable frequencies if the voice signals are to be detected without distortion. To maintain frequency stability it is necessary to regulate the temperature of the oscillator environment. For oscillators located at subscriber locations, where the environmental temperature is relatively uncontrolled, the task of maintaining a constant oscillator temperature requires costly ovens and similar equipment. Somewhat less costly is the task of maintaining a constant temperature oscillator located at the central station; this is because the temperature at the central station is relatively controllable.

Certain frequency multiplex station carrier equipment now in use is able to provide relatively low cost per channel by minimizing the number of oscillators required. However, such equipment employs double-sideband AM transmission and, in at least one instance, FM transmission. Double sideband transmission and FM transmission each require more than a 4 KHz band per channel; therefore, it is not possible for 12 channels to share a common transmission line and still meet the REA frequency standard illustrated in FIG. 1. While single sideband AM transmission would permit use of twelve channels on a line, known SSB techniques require four costly oscillators per channel (two for transmission, two for detection).

Another high cost in station carrier equipment results from the utilization of many non-identical components in each channel. For example, non-standard narrow band filters can be expensive if purchased in small lots, whereas great savings are possible if standard filters are purchased in large quantities. Thus, if each channel requires filters having different passbands, the cost per channel becomes relatively high.

It is a broad object of the present invention to provide a frequency multiplexed telephone carrier system which permits a maximim number of channels to share a common transmission line in the most economical manner.

It is a more specific object of the present invention to provide an inexpensive station carrier system which meets the REA frequency standard yet permits twelve channels to share a frequency multiplexed transmission line.

It is another object of the present invention to provide a station carrier system of the type described which requires only one oscillator per channel, that oscillator being located at the central office.

It is still another object of the present invention to provide a station carrier system of the type described wherein identical bandpass filters are employed in all channels.

SUMMARY OF THE INVENTION

In accordance with one aspect of the present invention, single sideband (SSB) amplitude modulation (AM) transmission is employed with the carrier being inserted in the transmitted signal to serve as a reference frequency. Each subscriber carrier is an integral submultiple of the central office carrier for that channel, permitting the subscriber carrier to be derived, at both the subscriber and central office stations from the central office carrier by means of frequency division. By using SSB transmission, 12 4 KHz channels are possible. By deriving the subscriber carrier from the central office reference carrier, only one oscillator per channel is required.

In another aspect of the present invention, each channel signal is processed and detected at a standard intermediate frequency (IF) obtained from one oscillator located at the central office and common to all channels. By dividing the IF to a suitable value, the signal can be transmitted via the transmission line to the subscriber stations where it can be multiplied back to its original frequency for use in processing and detection. Processing and detection at IF permits identical standard filters to be used in each channel.

In still another aspect of the present invention, the technique of integrally relating the subscriber and central office carriers and the technique of processing and detecting at IF are combined to minimize the number of oscillators and standardize the components in each channel.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

Before describing the invention in detail, it is important to clarify certain conventions and shorthand notations employed in the course of the description. The various 4 KHz channels utilized in the system are understood to include a sideband extending from approximately 300 Hz to 3,100 Hz from a carrier. However, for shorthand purposes, the description refers to these bands as 4 KHz wide. Likewise, various band pass filters are described as having 4 KHz pass bands (e.g., 20–24 KHz) whereas the 3 db points of the filter are actually spaced by less than 4 KHz and accommodate only the single band and attentuate the carrier. In addition, the frequencies specified on the drawings are to be understood as being in KHz, the "KHz" designation being omitted from the drawings to avoid cluttering.

Figure 2:
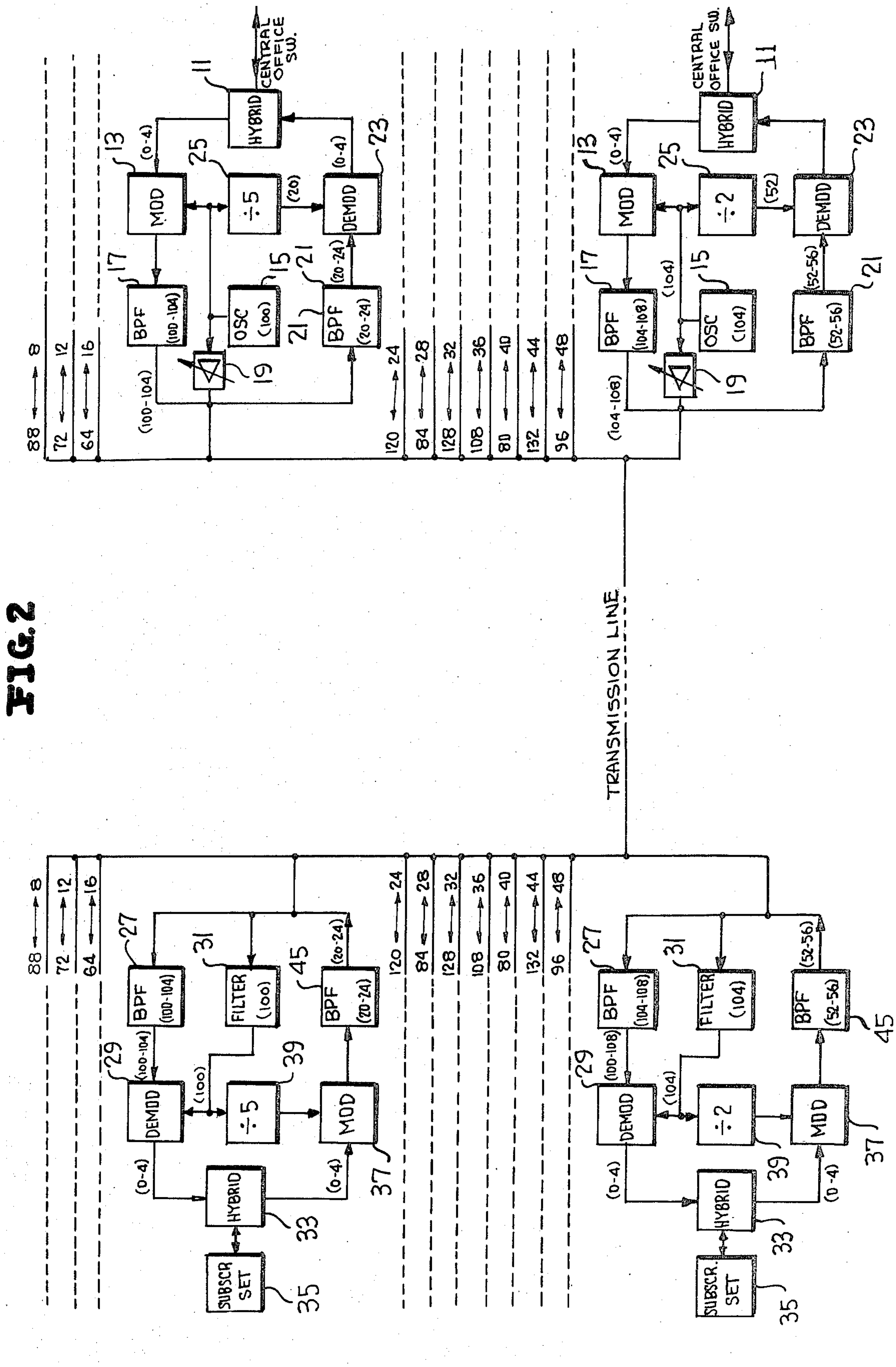
FIG. 2 is a schematic diagram of a preferred embodiment of the present invention.

Referring now to FIG. 2 of the accompanying drawings, there is illustrated a 12 channel frequency multiplex telephone system. Only two of the 12 channels are illustrated in detail since all channels use the same equipment, differing only in filter pass bands, oscillator frequencies, and frequency divider ratios. For the other 10 channels, the subscriber and central office carrier frequencies are designated in the drawing.

Figure 1:
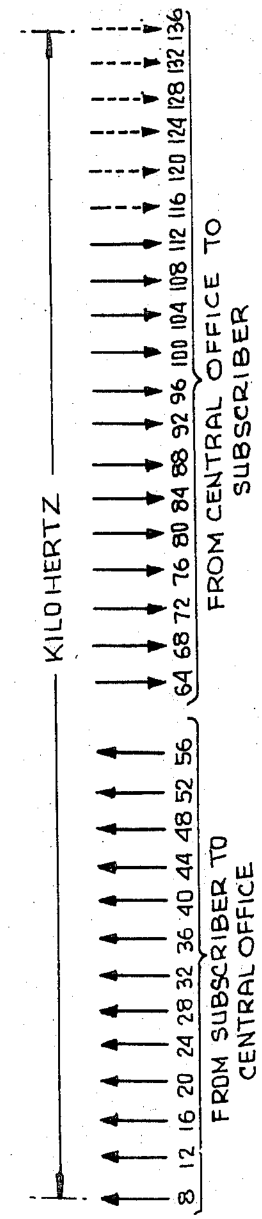
FIG. 1 is a diagrammatic representation of a frequency standard to which the equipment of the present invention conforms.

The philosophy behind the system of FIG. 2 is that SSB transmission permits 12 channels to share a common transmission line within the framework of the REA frequency standard of FIG. 1. Further, in order to eliminate the need for an oscillator at the subscriber location, each central office carrier frequency is chosen as an integral multiple of the corresponding subscriber carrier frequency. The central office carrier frequency may thus be transmitted with the sideband and divided at both the central office and subscriber locations to generate the subscriber carrier. Given the REA frequency standard of FIG. 1, numerous possible integrally-related combinations of the permitted subscriber and central office carrier frequencies are possible. One such combination is listed below in Table I:

TABLE I

| Subscriber Carrier (KHz) | Central Office Carrier (KHz) | Ratio |
|---|---|---|
| 8 | 88 | 11 |
| 12 | 72 | 6 |
| 16 | 64 | 4 |
| 20 | 100 | 5 |
| 24 | 120 | 5 |
| 28 | 84 | 3 |
| 32 | 128 | 4 |
| 36 | 108 | 3 |
| 40 | 80 | 2 |
| 44 | 132 | 3 |
| 48 | 96 | 2 |
| 52 | 104 | 2 |

The two channels illustrated in representative detail in FIG. 2 are those with subscriber carriers of 20 KHz and 52 KHz, respectively. Referring to the former, the portion of the channel located at the central office includes a hybrid coupler 11 which receives audio signals from and supplies audio signals to its own line connected to the central office switching equipment. Audio signals in a 0–4 KHz band are applied to a modulator 13 which also receives a 100 KHz carrier from a stable oscillator 15. Modulator 13 provides a conventional amplitude-modulated AM signal comprising the 100 KHz carrier and its two sidebands. This signal is applied to a band pass filter 17, having a pass band of 100–104 KHz, thereby eliminating the carrier and the lower sideband. The 100 KHz carrier is then re-inserted to an adjustable level via unidirectional signal insertion component 19, such as an adjustable gain amplifier, so that the upper sideband and the carrier are transmitted via the common transmission line to the subscriber location.

The subscriber equipment for the channel being described includes a band pass filter 27 having a 100–104 KHz pass band. The 100–104 KHz sideband passed by filter 17 at the central office equipment is thus passed by filter 27 and applied to demodulator 29. Also applied to demodulator 29 is the 100 KHz carrier transmitted from the central office and received and passed by a filter 31 in the subscriber portion of the channel. The detected voice signal provided by demodulator 29 is passed via hybrid coupler 33 to the subscriber set 35 where it is rendered audible.

Voice signals originating at the subscriber set 35 are passed via hybrid coupler 33 to a modulator 37. The carrier applied to modulator 37 is derived from the 100 KHz central office carrier received by filter 31. Specifically, the received 100 KHz signal is applied to frequency divider 39 which provides the required 20 KHz subscriber carrier. The latter is modulated by audio signals at modulator 37 and passed through band pass filter 41 which eliminates the lower sideband and the carrier and passes only the upper sideband (20–24 KHz). This sideband is transmitted to the central office via the common transmission line.

At the central office portion of the channel, the 20–24 KHz sideband is received by band pass filter 21 which is tuned to that sideband. The sideband is applied to a demodulator 23 where it is detected with the aid of a 20 KHz signal derived from the 100 KHz output signal from oscillator 15. Specifically, the 100 KHz signal is frequency divided by divider 25 to provide the 20 KHz signal. The resulting 0–4 KHz detected signal is then passed by hybrid 11 to the central office switching network.

The circuitry in the other eleven channels is identical, except for parameter differences indicated in Table I. Thus, in the other channel illustrated in FIG. 2, oscillator 15 provides a 104 KHz signal, frequency dividers 25 and 39 have a division ratio of two, filters 17 and 27 have a pass band of 104–108 KHz, filter 31 passes 104 KHz, and filters 21 and 45 have a pass band of 52–56 KHz.

It is possible to eliminate frequency divider 25 from the circuitry of FIG. 2. If this is done, the subscriber carrier is transmitted along with the sideband to the central office equipment. A filter would be required to separate the subscriber carrier at the appropriate central office channel circuit.

It is also possible to provide a single oscillator, common to all channels, and divide its output frequency as necessary to obtain each central office carrier frequency. This approach reduces the number of oscillators to one per 12 channels; however frequency division logic circuitry becomes relatively complex.

The common transmission line for the 12 channels of FIG. 2 is a simple wire pair from which a subscriber circuit can be tapped at any point.

Figure 4:
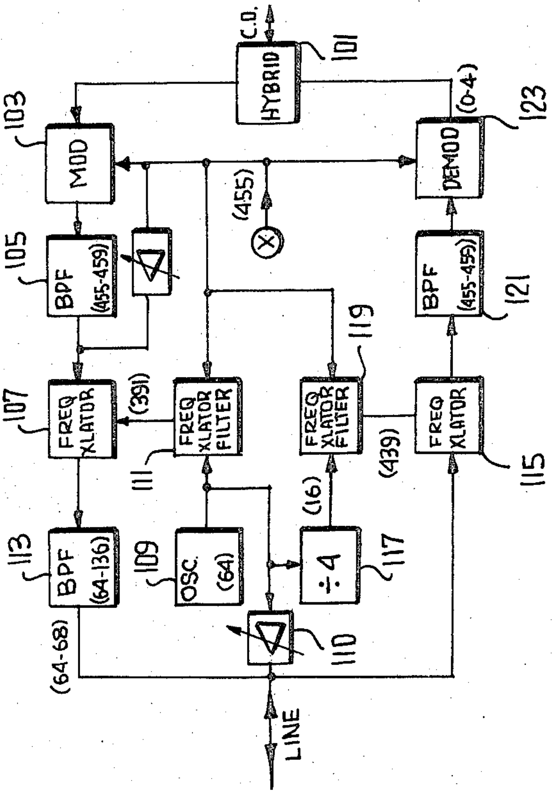
FIG. 4 is a schematic diagram of the central office portion of a single channel for use in still another embodiment of the present invention.
Figure 5:
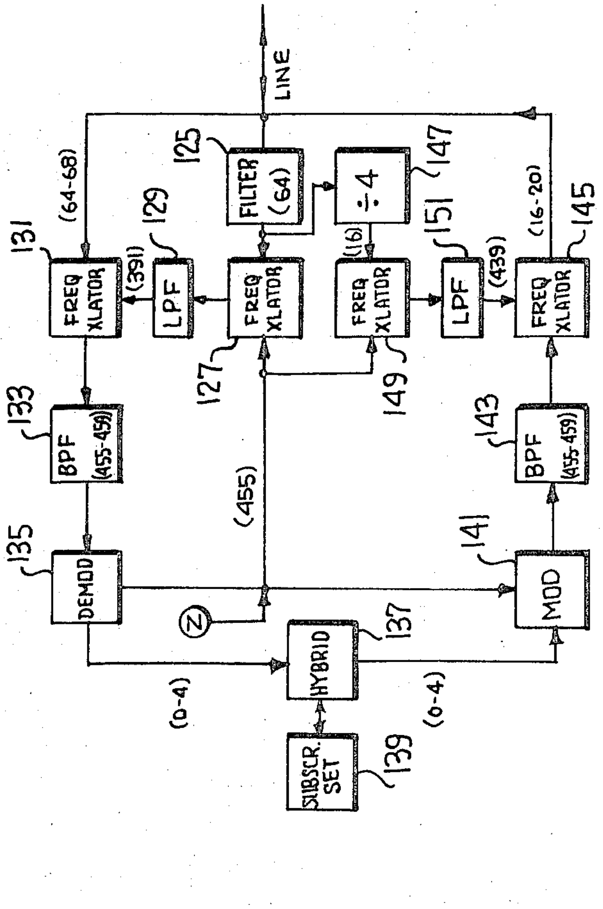
FIG. 5 is a schematic diagram of the subscriber portion of the single channel whose central office portion is illustrated in FIG. 4.

As described above, oscillator 15, filters 17, 27, 21, 31 and 45, and dividers 25 and 39 differ from channel to channel. In some instance it is desirable to standardize the components in each channel as much as possible to further reduce cost. An embodiment of the present invention which permits a high degree of standardization of components, and is introductory to the embodiment of FIGS. 4 and 5, is illustrated in FIG. 3.

Figure 3:
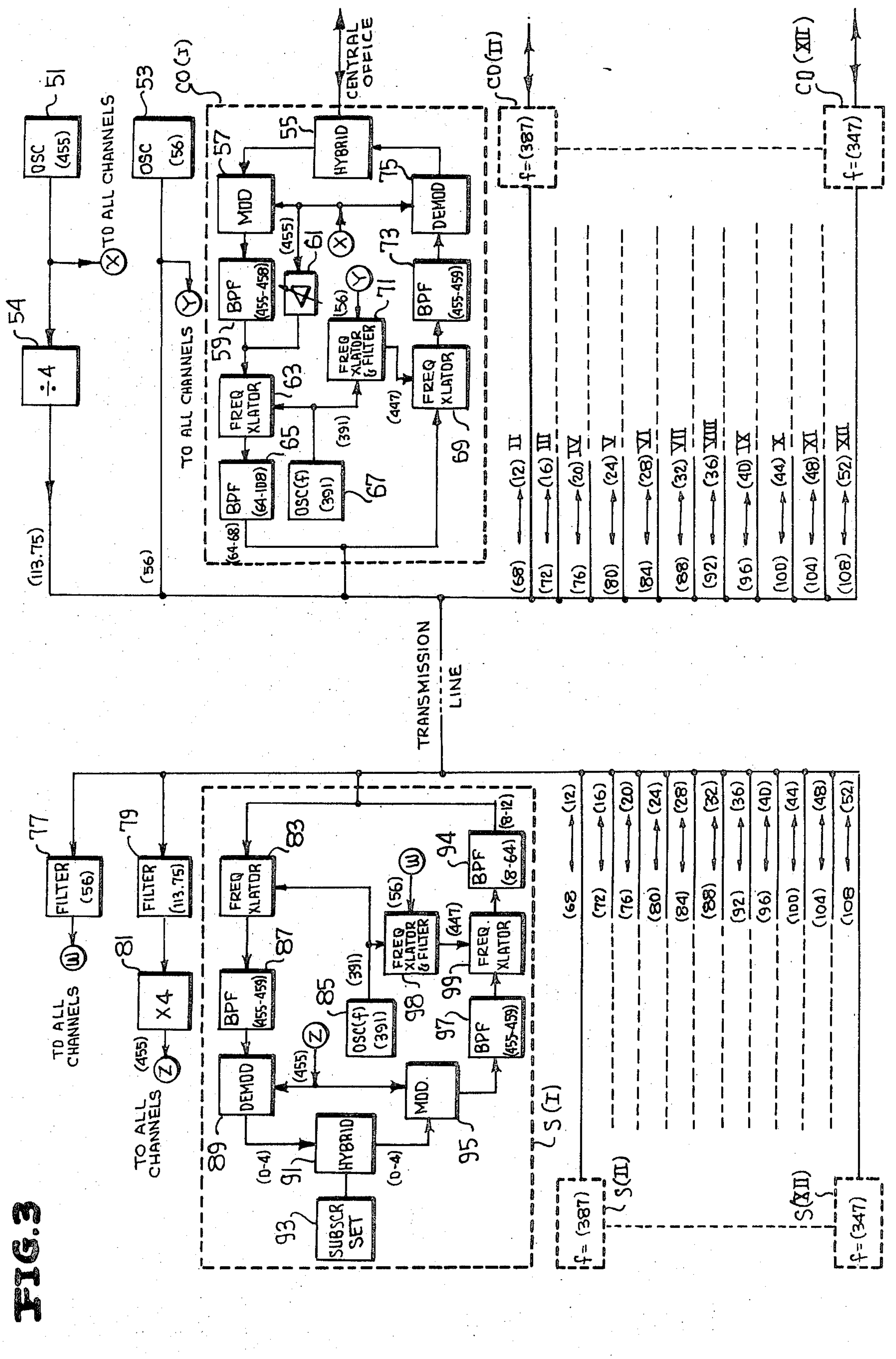
FIG. 3 is a schematic diagram of an alternative embodiment of the present invention.

Referring specifically to FIG. 3, component standardization is accomplished by modulating and demodulating at an intermediate frequency (IF) which is common to all channels. A single stable 455 KHz oscillator 51 is located at the central station and is common to all channels. The signal line designated "*x*" in FIG. 3 represents the 455 KHz signal applied to each channel circuit located at the central station. Another oscillator 53 is located at the central office and provides a 56 KHz signal, common to all channels, and which serves as a frequency translation reference in the manner described below. The signal line designated "Y" in FIG. 3 represents the 56 KHz signal applied to each channel circuit at the central office.

Only one channel (I) is illustrated in detail in FIG. 3, that channel being the one having a 64 KHz central office carrier. The central office equipment CO(I) through CO(XII) for each channel includes a hybrid coupler 55 which is connected to the switching equipment at the central office. Signals to be transmitted via channel I are passed by its hybrid 55 to amplitude modulator 57 which also receives the 455 KHz signal from oscillator 51. The resulting signal from modulator 57 is applied to IF band pass filter 59 which is tuned to the upper sideband (455–459 KHz). This sideband is combined with the 455 KHz carrier, via unidirectional signal insertion component 61, and applied to frequency translator 63.

The only component in circuit CO(I) which is non-standard (i.e., not identical in each channel) is stable oscillator 67 which provides a different frequency (*f*) for each channel. Frequency (*f*) is determined by the central office carrier frequency for each channel; specifically, frequency (*f*) is the difference between 455 KHz and the central office carrier. In circuit CO(I), frequency (*f*) is 455 KHz minus 64 KHz; or 391 KHz.

The 391 KHz signal is applied to frequency translator 63, along with the 455–459 KHz signal from filter 59. The difference frequency output signal (64–68 KHz) from frequency translator 63 is selected by band pass filter 65 and passed to the common transmission line. Filter 65 has a 64–108 KHz pass band and is identical in each channel.

Transmitted along with the various channel bands via the common transmission line is the 56 KHz signal from oscillator 53. This signal is received by a notch filter 77, which may be common to all subscriber circuits S(I) through S(XII) or there may be one such filter in each subscriber circuit. The signal line designated "W" in FIG. 3 represents the received 56 KHz frequency translation reference signal applied to all 12 subscriber circuits.

Also transmitted with the various channel band signals is a 113.75 KHz signal derived from common oscillator 51 by a divide-by-four frequency divider 54. This signal is received by a single notch filter 79 which is common to all 12 subscriber circuits. The filtered 113.75 KHz signal is then multiplied by four in circuit 81 to restore the 455 KHz IF. Circuit 81, for example, may comprise a harmonic generator and filter. The line designated "Z" in FIG. 3 represents the restored IF signal applied to each subscriber circuit. Dependent upon the physical distribution of the 12 subscriber circuits, it may be desirable to provide a 113.75 KHz filter 79 and multiplier circuit 81 in each subscriber circuit. Also, the use of four as a division factor for the 455 KHz IF signal is not unique; any suitable division factor may be employed. Likewise the 455 KHz frequency is not unique and any suitable frequency may be utilized to standardize the filters in each channel.

The 64–68 KHz sideband from circuit CO(I) is detected at subscriber circuit S(I). Circuit S(I) includes frequency translator 83 which receives the 64–68 KHz channel signal and a 391 KHz signal from oscillator 85. The latter is the only component in circuit S(I) which is non-standard (i.e., not identical in each of S(I) through S(XII). Oscillator 85 in each channel provides a highly stable frequency (*f*) equal to the frequency (*f*) of oscillator 67 in that channel.

The upper sideband of the output signal from frequency translator 83 is selected by a 455–459 KHz band pass filter 87 and passed to demodulator 89. The latter also receives the restored 455 KHz IF signal and provides the 0–4 KHz difference frequency signal to hybrid coupler 91 and, in turn, to the subscriber telephone 93.

As described above, sideband selection of received signals by circuit S(I) is effected by IF filter 87. Importantly, this filter is identical in each of circuits S(I) through S(XII).

Signals sent from the subscriber set 93 for transmission to the central station are applied via hybrid coupler 91 to amplitude modulator 95 which also receives the restored IF signal. The upper sideband is selected from the output signal of modulator 95 by band pass filter 97 (identical in all channels) which in turn feeds frequency translator 99.

A frequency translator and filter circuit 98 receives the 391 KHz signal from oscillator 85 and the received 56 KHz pilot signal from the common filter 77. Circuit 98 includes a high pass filter to select the upper sideband frequency (477 KHz) and applies this signal to frequency translator 99. The difference frequency (8–12 KHz) between the 455–459 KHz sideband from filter 97 and the 447 KHz signal from frequency translator and filter 98 is passed by band pass filter 94 and applied to the common transmission line. Filter 94 has a pass band of 8–64 KHz and is identical in each of circuits S(I) through S(XII).

The 8–12 KHz sideband is detected at circuit CO(I). The detection portion of the circuit includes frequency translator 69 which receives the signal from the common transmission line. Frequency translator 69 also receives a 447 KHz signal derived at frequency translator and filter circuit 71 as the upper sideband of the modulation product of the 56 KHz signal from oscillator 53 and the 391 KHz signal from oscillator 67. Band pass filter 73 selects the 455–459 KHz frequency band from frequency translator 69 and applies it to demodulator 75. The latter also receives the 455 KHz signal from oscillator 51 and provides the 0–4 KHz voice signal to the telephone switching network via hybrid 55.

Once again it is noted that sideband selection is achieved by an IF filter which is identical in each channel. In fact, the only components which differ from channel to channel are oscillators 67 and 85 which provide frequency (*f*).

It is also to be noted that the subscriber carrier frequency in FIG. 3 need not be an integral sub-multiple of the central office carrier. In fact, the central office carrier in FIG. 3 always exceeds the subscriber carrier by 56 KHz, the frequency of the pilot signal. The frequency (*f*) of oscillators 67 and 85 in each channel is equal to the frequency difference between 455 KHz and the central office carrier in that channel. Table II lists the values of the central office carrier, subscriber carrier, and (*f*) for each channel in FIG. 3.

TABLE II

| Channel | Subscriber Carrier (KHz) | Central Office Carrier (KHz) | (f) (KHz) |
|---|---|---|---|
| I | 8 | 64 | 391 |
| II | 12 | 68 | 387 |
| III | 16 | 72 | 383 |
| IV | 20 | 76 | 379 |
| V | 24 | 80 | 375 |
| VI | 28 | 84 | 371 |
| VII | 32 | 88 | 367 |
| VIII | 36 | 92 | 363 |
| IX | 40 | 96 | 359 |
| X | 44 | 100 | 355 |
| XI | 48 | 104 | 351 |
| XII | 52 | 108 | 347 |

As described above, an important advantage of the system of FIG. 2 resides in the fact that only one stable oscillator is required per channel. In FIG. 3 two stable oscillators are required per channel but component standardization is increased because detection is effected at IF instead of audio frequencies. It is possible to combine the advantages of both systems in a single system employing 12 central office circuits of the type illustrated in FIG. 4 and 12 subscriber circuits of the type illustrated in FIG. 5. In describing this system it is to be understood that the 455 KHz IF signal is provided at the central office from a single common oscillator and is applied to each central office circuit at the point designated "X" in FIG. 4. Likewise, the IF signal is divided down to 113.75 KHz (or other suitable value) and transmitted via the common transmission line, restored to 455 KHz, and applied to each subscriber circuit at the point designated "Z" in FIG. 5. The 56 KHz translation reference is not required for this embodiment.

Referring specifically to FIG. 4, audio frequency signals for transmission to the subscriber are received by hybrid coupler 101 and applied to modulator 103. The latter also receives the common IF (455 KHz) signal. The resulting upper sideband is selected and applied to frequency translator 107.

The other signal applied to translator 107 has a frequency which is different in each of the 12 channels and depends upon the central office carrier frequency in each channel. For purposes of FIG. 4 it is assumed that the central office carrier is 64 KHz and is derived from a stable oscillator 109. The 64 KHz signal is applied along with the 455 KHz IF signal to a frequency translator and filter circuit 111 which selects the lower sideband (391 KHz) for application to frequency translator 107.

The resulting 64–68 KHz signal is passed through band pass filter 113 to the common transmission line. Filter 113 has a 64–136 KHz pass band and is identical in each central office circuit.

Also transmitted with the 64–68 KHz sideband is a 64 KHz carrier signal from oscillator 109 which is transmitted via buffer amplifier 110. The transmitted central office carrier serves as a pilot frequency for detection at the subscriber circuit for the illustrated channel. This eliminates the need for the 56 KHz oscillator used in the system of FIG. 3.

Referring to FIG. 5, the central office carrier, in this case 64 KHz, is selected by filter 125 and applied to a frequency translator 127 along with the restored 455 KHz IF signal. The lower sideband (391 KHz) is selected from the translator output signal by a low pass filter 129 and is applied to frequency translator 131. The latter also receives the 64–68 KHz sideband which is converted by translator 131 to IF and passed to IF filter 133. The latter selects the upper sideband (455–459 KHz) and applies it to demodulator 135, where the signal is restored to the 0–4 KHz audio frequency range. This signal is then applied to the subscriber set 139 via hybrid coupler 137.

Signals originating at subscriber set 139 are converted to IF (455–459 KHz), by modulator 141 and filter 143, and applied to frequency translator 145. A local oscillatory signal is also applied to translator 145; this signal is derived from the received central office carrier and the restored IF signal. Specifically, the received 64 KHz central office carrier is applied to frequency divider 147 where its frequency is divided by four to provide a 16 KHz signal. The division factor of divider 147 varies among subscriber circuits and depends upon the ratio between central office and subscriber carrier frequencies in each channel. This ratio is an integer, as in the case in the system of FIG. 2. The carrier frequency and ratio values listed in Table I may be utilized for the embodiment of FIGS. 4 and 5; other ratios may also be employed.

The 16 KHz signal from frequency divider 147 is applied to translator 149 along with the restored 455 KHz IF signal. The lower sideband (439 KHz) is then selected by low pass filter 151 and applied to translator 145. The resulting difference frequency band (16–20 KHz) is then transmitted to the central office on the common transmission line.

The 16–20 KHz band is detected by the circuit of FIG. 4. Specifically, the band is received by frequency translator 115 which also receives a 439 KHz signal from frequency translator and filter circuit 119. The 439 KHz signal, which is a different frequency in each central office circuit, is derived from the 455 KHz IF signal and a 16 KHz signal. The latter is derived from the 64 KHz signal of oscillator 109 via a divide-by-four frequency divider 117.

The IF output signal from translator 115 is applied to filter 121 which selects the 455–459 KHz sideband and applies it to demodulator 123. The latter also receives the 455 KHz IF signal and functions to detect the original 0–4 KHz audio frequency signal. The latter is applied via hybrid 101 to the telephone switching network.

As noted, the embodiment of FIGS. 4 and 5 requires a single stable oscillator per channel in addition to the IF oscillator common to all channels. Since detection in each channel is effected at IF frequency, circuit standardization is optimized. In fact, the only components which differ from channel to channel are oscillator 109, frequency dividers 117 and 147 (which are identical in those channels having the same central office to subscriber carrier ratio), and filter 125.

It is possible to obtain the central office carrier signal from a single common oscillator for all channels. This would require a high frequency oscillator whose signal is frequency-divided as necessary to obtain the various central office carriers. While such an embodiment requires additional dividers, it reduces the number of stable oscillators to two (including the IF oscillator) per 12 channel system.

In all of the embodiments described herein the upper sideband of a modulated carrier has been utilized to carry the information signal between central office and subscriber. Of course it would be possible to use the lower sideband for this purpose, whereupon appropriate changes in the filter pass bands would be required.

It is to be understood that conventional expedients, such as delay equalizers, repeaters, etc. may be utilized as requested in the system of the present invention.

While only one stable oscillator per channel is described for the embodiments of FIGS. 2, 4 and 5, it is to be understood that additional oscillators, which are synchronized in frequency to the stable oscillator, may be utilized. Such additional oscillators may include a subscriber carrier oscillator at each subscriber circuit which is locked, by frequency injection or similar techniques, to the sub-multiple of the central office carrier frequency. Other frequency-locked oscillators may also be employed. Importantly, these frequency-locked oscillators do have to be highly stable and are therefore relatively inexpensive.

It should also be mentioned that the 56 KHz frequency translation reference employed in the embodiment of FIG. 3 need not be 56 KHz, although this is a convenient frequency.

The various frequency translators illustrated in FIGS. 3, 4 and 5 may be simple mixers or other frequency summing and/or differencing devices.

It is also possible, within the scope of the present invention, to utilize the same group of station carrier oscillators for more than one group of channels. Thus, for example, two or more groups of 12 frequency multiplexed channels may each derive their central office carriers from the same oscillator; this further reduces the cost per channel.

It is also contemplated within the scope of this invention to employ modulation and demodulation techniques other than those described. For example, the phase shift methods of single sideband signal generation and reception may be utilized herein to minimize the filtering requirements. This approach is described in greater detial in U.S. Pat. application Ser. No. 271,738, filed on concurrent date herewith by Hekimian et al., entitled "Station Carrier Equipment Employing Phase Shift Method of SSB Generation and Reception," and assigned to the same assignee as the present application.

In view of the foregoing, the advantages of applicant's invention will be apparent to those skilled in the field of telephony. By selecting the subscriber carrier in each channel as an integral sub-multiple of the central office carrier in that channel, the need for a stable oscillator at the subscriber location is avoided. This in turn permits economic utilization of SSB transmission without requiring a stable oscillator at the subscriber's premises. By utilizing SSB transmission, 12 channels may be combined in conformity with the REA frequency standard of FIG. 1.

While I have described and illustrated specific embodiments of my invention, it will be clear that variations of the details of construction which are specifically illustrated and described may be resorted to without departing from the true spirit and scope of the invention as defined in the appended claims.

I claim:

1. A frequency-multiplexed carrier communications system for transmitting a plurality of single sideband frequency signals of the same nominal bandwidth between a central station having a plurality of channel circuits and a respective plurality of remote stations via a common transmission line, wherein transmission from said central station to each remote station employs a central station carrier frequency which is different for each remote station, and wherein transmission from each remote station to said central station employs a remote station carrier frequency which is different for each remote station, the central and remote station carrier frequencies being arranged in respective non-overlapping frequency bands, said system being characterized by:

a single stable IF oscillator located at said central station for providing an IF signal for common utilization for all of said remote stations;

means for transmitting via said common transmission line a reference signal derived from said IF signal to said remote stations;

means located at said remote stations for receiving the transmitted reference signal from said common transmission line and restoring said IF signal therefrom;

at said central station said plurality of channel circuits each comprising: means for modulating said IF signal with externally-supplied audio frequency signals to provide a first IF band; means for converting said first IF band to a single sideband of one of said central station carrier frequencies; means for applying said single sideband to said common transmission line for transmission to said remote station; means connected to said common transmission line for receiving a sideband of said remote station carrier and converting it to a second IF band; and means for detecting audio frequency signals appearing as modulation in said converted IF band; and at each said remote station: means for modulating the restored IF signal with further externally supplied audio frequency signals to provide a third IF band; means for converting said third IF band to a single sideband of said remote station carrier frequency; means for applying said single sideband of said remote station carrier frequency to said common transmission line for transmission to said central station; means connected to said common transmission line for receiving a sideband of said central station carrier and converting it to a fourth IF band; and means for detecting audio frequency signals appearing as modulation in said fourth IF band.

2. A twelve channel frequency-multiplexed telephone system for transmitting information between twelve central stations located at a central office and twelve respectively paired remote subscriber stations via a common transmission line, wherein each central station employs a different central station carrier frequency to transmit information from that central station to its respectively paired subscriber station, wherein each subscriber station employs a different subscriber carrier frequency to transmit information to its paired central station, and wherein said subscriber carrier frequencies are arranged approximately 4 KHz apart between 8 and 56 KHz and said central office carrier frequencies exceed 60 KHz and are multiples of 4 KHz, each central station-subscriber station pair including:

at said central station:

a stable source oscillator for providing a central station carrier signal for said channel;

means for amplitude modulating said central station carrier signal with externally-derived audio frequency signal to provide a single sideband of said central station carrier signal;

means for transmitting said central station carrier signal and said one sideband to the subscriber station paired with said central station via said common transmission line;

filter means for passing from said common transmission line a single sideband of the subscriber carrier frequency of the subscriber station paired with said central station;

a first frequency divider for receiving and dividing the frequency of said central station carrier signal to derive a demodulation signal having the same frequency as the subscriber carrier frequency of the subscriber station paired with said central station;

demodulator means employing said demodulation signal to demodulate the single sideband passed by said filter means;

at said subscriber station:

further filter means for passing the single sideband transmitted from said central station via said common transmission line;

a narrow band filter arranged to pass only the central station carrier signal transmitted from said central station via said common transmission line;

further demodulator means for demodulating the single sideband passed by said further filter means with the central station carrier signal passed by said narrow band filter;

means for receiving externally-derived audio frequency signals to be transmitted to said central station;

a second frequency divider for receiving and deriving the frequency of the central station carrier signal passed by said narrow band filter to derive said subscriber carrier signal;

modulator means for amplitude modulating said derived subscriber carrier signal with the externally-derived audio frequency signals to be transmitted to said central office to provide a single sideband of said derived subscriber station carrier frequency; and means for transmitting said single sideband of said derived subscriber carrier frequency to said central station via said common transmission line.

3. The system according to claim 2 wherein the central station carrier frequency in each channel is an integral multiple of the subscriber carrier frequency in that channel.

4. Electronic apparatus for use in a frequency-multiplexed carrier telephone system and adapted to be placed at subscriber stations located remote from central station telephone equipment, said apparatus comprising a modulation-demodulation circuit characterized by the absence of a stable oscillator and including:

a first circuit junction adapted to be connected to a telephone line;

a first bandpass filter connected to said first circuit junction and having a relatively narrow first pass band which permits passage of only a first carrier frequency;

a second bandpass filter connected to said first circuit junction and having a relatively wide pass band which permits passage of only a single sideband of said first carrier frequency;

a demodulator connected to receive the signals passed by said first and second bandpass filters and provide audio output signal at the difference frequencies between said passed signals;

a frequency divider arranged to receive said signal passed by said first bandpass filter and provide a signal at a second carrier frequency which is an integral submultiple of said first carrier frequency;

a modulator connected to receive audio signal from exteriorly of said circuit and to receive said signal at said second carrier frequency from said frequency divider to provide a modulated signal at frequencies within a single sideband of said second carrier frequency; and means for coupling said modulated signal to said first circuit junction.

5. Electronic apparatus for use in a frequency-multiplexed carrier telephone system and adapted to be placed at subscriber stations located remote from central station telephone equipment, said apparatus comprising a modulation-demodulation circuit characterized by the absence of a stable oscillator and including:

a circuit junction adapted to be connected to a telephone line;

a first narrow band filter connected to said circuit junction and tuned to pass only signal at a first carrier frequency;

a second narrow band filter connected to said circuit junction and tuned to pass only signal at an integral submultiple of 455 KHz;

a frequency multiplier arranged to receive signal passed by said second narrow band filter and convert the received signal to a 455 KHz signal;

a first frequency translator arranged to receive signal passed by said first narrow band filter and the 455 KHz signal from said frequency multiplier and to provide a first translation signal having a frequency equal to the difference between the frequencies of the signals passed by said first and second narrow band filters;

a second frequency translator arranged to receive said first translation signal from said first frequency translator and a single sideband of said first carrier frequency from said circuit junction and to convert said single sideband of said first carrier frequency to a single sideband of 455 KHz;

a demodulator adapted to receive said single sideband of 455 KHz from said second frequency translator and said 455 KHz signal from said frequency multiplier and to provide a band of detected audio signals;

a modulator arranged to receive audio signals applied from externally of said circuit and said 455 KHz signal from said frequency multiplier and to provide a modulated signal in a single sideband of 455 KHz;

a frequency divider arranged to receive said signal at said first carrier frequency from said first narrow band filter and provide a second carrier signal at a second carrier frequency which is an integral sub-multiple of said first carrier frequency;

a third frequency translator arranged to receive said second carrier signal from said frequency divider and said 455 KHz signal from frequency multiplier and to provide a second translation signal at the difference frequency between 455 KHz and said second carrier frequency;

a fourth frequency translator arranged to receive said second translation signal and said modulated signal from said modulator and to convert said modulated signal to a single sideband of said second carrier frequency; and coupling means for connecting the signal converted to by said fourth frequency translator to said circuit junction.

6. A frequency-multiplexed carrier communications system of the type employing a common transmission line to transmit communication signals between each of plural stations connected to one end of said transmission line and respective counterpart stations connected to the other end of said transmission line, said system comprising:

at each of said plural stations:

a circuit junction connected to said transmission line;

a stable oscillator for generating a carrier signal, the frequency of said carrier signal being different for each of said plural stations;

modulator means for receiving externally supplied intelligence signal subsisting within a limited frequency band and amplitude-modulating said carrier signal with said intelligence signal to generate a suppressed carrier single sideband signal, the single sideband signals generated at said plural stations being non-overlapping in frequency;

means connecting said single sideband signal and said carrier signal to said circuit junction for transmission via said common transmission line;

a frequency divider responsive to said carrier signal for providing a demodulating signal at a frequency which is an integral sub-multiple of the frequency of said carrier signal;

a bandpass filter connected to said circuit junction for receiving signals from said transmission line and passing only single sideband signals of a carrier signal having a frequency equal to the frequency of said demodulating signal; and a demodulator responsive to said demodulating signal and signals passed by said bandpass filter for providing detected intelligence signal;

at each of said counterpart stations:

a further circuit junction connected to said transmission line;

a narrow band filter connected to said further circuit junction for receiving signals from said transmission line and passing only signals at a predetermined frequency, said predetermined frequency being different at each counterpart station and being equal to the carrier frequency generated at a respective one of said plural stations;

a further bandpass filter connected to said further circuit junction for receiving signals from said transmission line and passing only single sideband signals of a carrier signal having said predetermined frequency;

a demodulator responsive to the signals passed by said narrow band and further bandpass filters for detecting the intelligence signal externally supplied to the modulator means at said respective one of said plural stations;

a further frequency divider responsive to signal passed by said narrow band filter for generating a further carrier signal at a frequency which is an integral sub-multiple of the signal frequency passed by said narrow band filter, said integral sub-multiple being the same as the integral sub-multiple effected by the frequency divider means at said respective one of said plural stations;

further modulator means responsive to further externally-supplied intelligence signal within a limited frequency band and said further carrier signal for amplitude modulating said further carrier signal with said further intelligence signal to generate a suppressed-carrier single sideband of said further carrier signal, the single sidebands generated at said plural and counterpart stations being non-overlapping in frequency.

7. The system according to claim 6 wherein all of said plural stations are connected to the same end of said common transmission line and all of said counterpart stations are connected to the opposite end of said common transmission line.

8. The system according to claim 7 wherein said counterpart stations are telephone subscriber stations, said plural stations are central office stations, and said common transmission line is a telephone line, said system being further characterized in that said telephone subscriber stations and central office stations are each 12 in number, the carrier frequencies generated at said 12 telephone subscriber stations residing between 8 and 56 KHz at intervals of 4 KHz, the carrier frequencies generated at said central office stations being greater than 60 KHz.

9. A frequency-multiplexed carrier telephone system of the type employing a common telephone line to service a plurality of subscriber stations from a respective plurality of central stations located at a central telephone office, said subscriber stations being paired with respective central stations for purposes of communication, each central station being assigned a different transmit carrier frequency lying within a first range of frequencies and a different receive carrier frequency lying within a second range of frequencies which does not overlap said first range of frequencies, each subscriber station being assigned a different transmit carrier frequency corresponding to the receive carrier frequency of its paired central station and a different receive carrier frequency corresponding to the transmit carrier frequency of its paired central station, said system being characterized by the need for no more than one stable oscillator to be utilized with each paired combination of subscriber station and central station, and by the fact that the receive carrier frequency of each central station is an integral sub-multiple of the transmit carrier frequency of the central station, said system including:

at each central station:

means for transmitting the central station transmit carrier along with a single sideband of that carrier via said telephone line;

means for receiving a single sideband of the central station receive carrier from said telephone line; and means for detecting intelligence signal appearing in the received single sideband;

at each subscriber station:

means for receiving the transmit carrier transmitted from the central station paired with said each subscriber station;

means for receiving the single sideband transmitted from the central station paired with said each subscriber station;

demodulation means responsive to the central station transmit carrier and sideband thereof received at said each subscriber station for detecting intelligence signal appearing in that single sideband;

frequency divider means having a division ratio corresponding to the integral sub-multiple relationship between the transmit and receive carriers of said each subscriber station and responsive to the received central station transmit carrier for providing said subscriber station transmit carrier;

means for modulating said subscriber station transmit carrier with externally-derived signal to provide a single sideband of said subscriber station transmit carrier; and means for transmitting said single sideband of said subscriber station transmit carrier via said telephone line.

10. The system according to claim 9 wherein said means for detecting at each central station comprises:

a frequency divider responsive to said central station transmit carrier for providing a demodulation signal at the receive carrier frequency of said central station; and a demodulator responsive to said demodulation signal for demodulating the single sideband received at said central station.

11. The system according to claim 9 wherein said subscriber stations are 12 in number and the subscriber transmit carrier frequencies are multiples of 4 KHz and are spaced 4 KHz apart in a range from 8 KHz to 56 KHz, and wherein said central station transmit carrier frequencies are all integral multiples of 4 KHz and greater than 60 KHz.

12. The system according to claim 11 wherein the highest central station transmit carrier frequency is 136 KHz.

13. The system according to claim 9 further comprising:

a single stable IF oscillator located at said central office for providing a common IF signal for all of said central and subscriber stations;

frequency divider means responsive to said common IF signal for providing a reference signal at a lower frequency than said IF signal;

means for transmitting said reference signal via said telephone line to said subscriber stations;

convertor means located at said subscriber stations for receiving said reference signal from said telephone line and restoring said IF signal therefrom;

at each central station: means for modulating said IF signal with externally-derived audio frequency signals to provide a first IF band; means for translating the frequency of said first IF band to a single sideband of said central station transmit carrier for transmission to said remote station; said means for detecting including means for converting a received single sideband of said subscriber station transmit carrier to a second IF band, and means for demodulating audio frequency signals appearing as modulation in said second IF band; and at each subscriber station, said means for modulating comprising means for amplitude-modulating said restored IF signal with externally-derived audio frequency signals to provide a third IF band, and means converting said third IF band to a single sideband of said subscriber station carrier; said means for detecting comprising means for translating the received single sideband of said central station carrier to a fourth IF band, and means for demodulating audio frequency signals appearing as modulation in said fourth IF band.

14. In a frequency-multiplexed carrier system of the type employing a common transmission line to service a plurality of remote stations from a respective plurality of centrally located local stations, each remote station being paired with a respective local station with which it alone communicates, a method comprising the steps of:

generating a frequency-stable first carrier signal at each local station, said first carrier signal having a different frequency at each local station;

modulating said first carrier signal at each local station with externally-derived intelligence signals to derive a single sideband of said first carrier signal;

transmitting from each local station said first carrier signal and said single sideband of said first carrier signal via said common transmission line to the remote station paired with said each local station;

at each remote station: receiving from said common transmission line the first carrier signal and single sideband thereof transmitted from the local station paired with said each remote station; and at each remote station, demodulating the received single sideband with the received first carrier signal to recover said externally-derived intelligence signal.

15. The method according to claim 14 further comprising the steps of:

at each remote station:

dividing the frequency of said received first carrier signal by a predetermined number to derive a second carrier signal having a frequency which is an integral sub-multiple of the frequency of said received first carrier signal;

modulating said second carrier signal with a further externally-derived intelligence signal to provide a single sideband of said second carrier signal;

transmitting said single sideband of said second carrier signal to the local station paired with said each remote station via said common transmission line;

at each local station:

receiving from said common transmission line the single sideband of said second carrier signal which is transmitted from the remote station paired with said each local station;

dividing the frequency of said first carrier signal by a further predetermined number to derive a demodulation signal having a frequency which is an integral sub-multiple of the frequency of said first carrier signal, said further predetermined number and said predetermined number being the same; and demodulating the received single sideband of said second carrier signal with said demodulation signal to recover said further externally-derived intelligence signal.

16. The method according to claim 15 wherein said system is a carrier telephone system in which said common transmission line is a telephone line frequency-shared by all of said remote stations, wherein said remote stations are subscriber stations and are 12 in number, and wherein said local stations are central office stations and are 12 in number, said second carrier signal frequencies being integral multiples of 4 KHz and spaced 4 KHz apart in a range from 8 KHz to 56 KHz, and wherein said first carrier signal frequencies are all integral multiples of 4 KHz and greater than 56 KHz.

17. A frequency multiplexed carrier communications system of the type employing a common transmission line and a plurality of pairs of first and second communications stations, each first station being connected to one end of said common transmission line and being arranged to communicate via said transmission line with the second station with which it is paired, said second stations being connected to the opposite end of said transmission line, wherein signals transmitted from each first station to its paired second station utilize a first carrier frequency which is different for each station pair, and signals transmitted from each second station to its paired first station utilize a second carrier frequency which is different for each station pair, said system being characterized by:

a single stable oscillator for each station pair located at said first station for providing a first carrier signal at said first carrier frequency;

means for applying said first carrier signal to said common transmission line;

at each first station:

first amplitude modulation means responsive to said first carrier signal and externally-derived information signal for providing a single sideband of said first carrier frequency;

means for applying said single sideband of said first carrier frequency to said common transmission line; and receiver means arranged to receive from said common transmission line and process only a single sideband of the second carrier frequency utilized by the second station paired with said each first station;

at each second station:

filter means for selectively passing from said common transmission line only the first carrier signal having the first carrier frequency utilized by the first station which is paired with said each second station;

a frequency divider connected to receive the first carrier signal passed by said filter means and provide said second carrier signal at a frequency which is an integral submultiple of the first carrier frequency;

second amplitude-modulation means responsive to said second carrier signal and further externally-derived information signal for providing a single sideband of said second carrier frequency;

means for applying said single sideband of said second carrier frequency to said common transmission line; and further receiver means arranged to receive from said common transmission line and process only a single sideband of the first carrier frequency utilized by the first station paired with said each second station.

18. The system according to claim 17 wherein:

said receiver means includes a further frequency divider at each first station and responsive to said first carrier signal for providing a demodulation signal at a frequency which is equal to the second carrier frequency utilized by the second station paired with said each first station, and a demodulator responsive to said demodulation signal and the received single sideband of the second carrier frequency for detecting the further information signal in that sideband; and said further receiver means includes a further demodulator responsive to said first carrier signal passed by said filter means and the received single sideband of said first carrier signal for detecting the information signal in that sideband.

19. The system according to claim 18 wherein said common transmission line is a telephone line, wherein said second stations are remote telephone subscriber stations, wherein said first stations are located at a common telephone facility, wherein said first carrier frequencies are multiples of 4 KHz and are greater than 56 KHz, wherein said second carrier frequencies are multiples of 4 KHz and are less than said first carrier frequencies, and wherein all of said single sidebands are less than 4 KHz in width.

* * * * *